US006254286B1

(12) United States Patent
Grumm et al.

(10) Patent No.: US 6,254,286 B1
(45) Date of Patent: Jul. 3, 2001

(54) METHOD FOR PRODUCING AN ELECTROOPTICAL MODULE

(75) Inventors: Mathias Grumm; Bernd Hanke; Frank Meyer-Güldner; Oliver Ölze, all of Berlin; Andreas Steffensen, Kleinmachnow, all of (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/259,639

(22) Filed: Mar. 1, 1999

Related U.S. Application Data

(63) Continuation of application No. PCT/DE97/01954, filed on Aug. 28, 1997.

(30) Foreign Application Priority Data

Aug. 28, 1996 (DE) ............................................... 196 36 239
Sep. 27, 1996 (DE) ............................................... 196 41 395

(51) Int. Cl.[7] .................................. G02B 6/42; G02B 6/36
(52) U.S. Cl. .................................. 385/88; 385/91; 385/92
(58) Field of Search ........................................ 385/88–94

(56) References Cited

U.S. PATENT DOCUMENTS

| 5,366,573 | * 11/1994 | Bayer et al. ............................. 156/64 |
| 5,513,290 | * 4/1996 | Ishikawa et al. ....................... 385/49 |
| 5,522,001 | * 5/1996 | Meadowcroft .......................... 385/88 |
| 5,737,133 | * 4/1998 | Ouchi et al. ........................... 385/92 X |

FOREIGN PATENT DOCUMENTS

| 27 47 773 | 6/1978 | (DE) . |
| 31 38 197 A1 | 6/1983 | (DE) . |
| 43 11 980 C1 | 6/1994 | (DE) . |
| 0 351 211 A2 | 1/1990 | (EP) . |
| 0 504 569 A2 | 9/1992 | (EP) . |

OTHER PUBLICATIONS

International Publication No. WO 94/19718 (Meadowcroft), dated Sep. 1, 1994.
International Publication No. WO 94/04955 (Meadowcroft), dated Mar. 3, 1994.
International Publication No. WO 97/21229 (Bayer et al.), dated Jun. 12, 1997.
"DELO Technical Info" VE 293. (No Date Available).

* cited by examiner

Primary Examiner—Rodney Bovernick
Assistant Examiner—Michael J. Stahl
(74) Attorney, Agent, or Firm—Herbert L. Lerner; Laurence A. Greenberg; Werner H. Stemer

(57) ABSTRACT

A module has on a front side a coupling socket for holding an optical fiber end, and at a rear side has a holding region for an electro optical component. The component is firstly prefixed in a position of maximum optical coupling by optical irradiation of an adhesive that can be cured both by light and by heat. After the prefixing, a permanent connection is made by thermal curing the adhesive in a temporally and/or spatially separate subsequent production step.

12 Claims, 3 Drawing Sheets

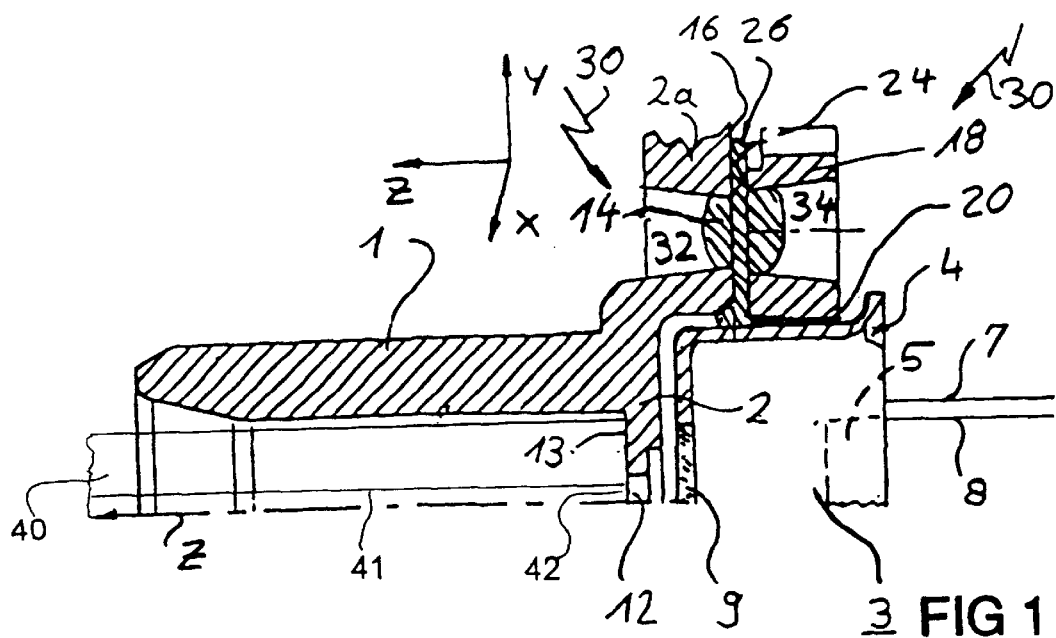

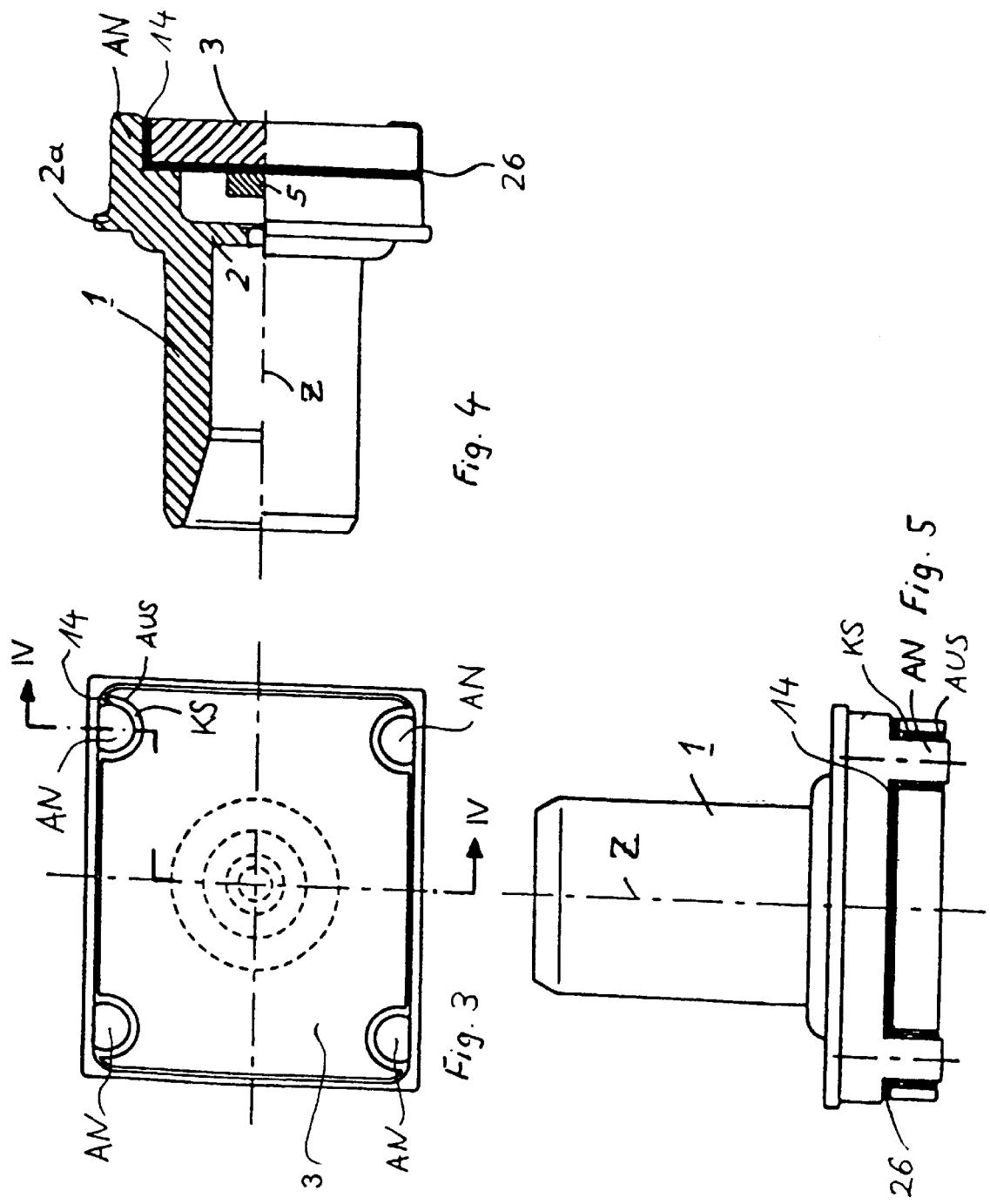

METHOD FOR PRODUCING AN ELECTROOPTICAL MODULE

CROSS-REFERENCE TO RELATED APPLICATION

This is a continuation of copending International Application PCT/DE97/01954, filed Aug. 28, 1997, which designated the United States.

BACKGROUND OF THE INVENTION

Field of the Invention

The invention is in the field of coupling optical and electro optical elements and, in particular, coupling an optical fiber end to an electro optical component. The invention also relates to a method for producing an electro optical module which has on the front side a coupling socket for holding an optical fiber end, and at the rear a holding region for an electro optical component, in which the electro optical component is brought into a position of maximum optical coupling with the optical fiber end held by the coupling socket, and in which the component is connected in this position to the holding region by an adhesive.

Within the scope of the present invention, an electro optical component is to be understood both as an optical transmitter (e.g. laser diode) and as a receiver (e.g. photodiode), which converts electric signals into optical ones and/or optical signals into electrical ones (optoelectronic transducer).

With electro optical modules, the aim is to ensure that the coupling efficiency between the coupling partners is as high as possible. For this purpose, it is necessary, for example, for the optical fiber end to be aligned with high precision with reference to the optically active surface (emitting or receiving surface, respectively) of the electro optical component. A lens can be disposed in the beam path between the optical fiber end and electro optical component. There is frequently the need for a demountable coupling of the optical fiber end, the optical fiber end usually being held in a central bore in a plug pin. The plug pin is inserted for coupling purposes into the coupling socket and removably fixed in the inserted position. In order to ensure a high coupling Q-factor even with regard to different combinations of coupling partners, the electro optical component must be fixed with high precision with reference to the coupling socket and therefore, indirectly, to the coupling partner to be held by the coupling socket, and in a way which is stable in the long term. Laser welding methods, which offer very good method results in conjunction with comparatively short machining periods can be applied for fixing purposes. In this case, the weldable components are, however, very restricted with regard to the choice of material, and are comparatively expensive. The devices and welding systems required to carry out the method also necessitates high investment.

It is for this reason that increasing use has been made of adhesives for connection, in particular for the purpose of producing cost-effective electrooptical modules. Favorably priced individual parts, for example made from plastic, can thereby be used.

Published European Patent Application EP 0 351 211 A2 discloses a method for producing an optical plug pin which simultaneously forms a housing for completely holding an electrooptical transducer configuration. In this case, the transducer configuration is introduced into a mold, surrounded by a sealing material that can be cured by light and/or heat, and fixed by curing the sealing material after alignment with a reference plug. A plug pin is created after removal from the mold, the transducer configuration being positioned precisely with reference to the concentric plug pin lateral surface.

A method of the type mentioned at the beginning has been disclosed in German Patent DE 43 11 980 C1. According to the known method, a module having a front sleeve for holding a plug pin and having a rear holding space for a laser diode is produced by using an optically curing adhesive. For the purpose of aligning the laser diode, a plug pin with an optical fiber end is inserted up to a stop, and the light emitted when the laser diode is driven is launched into the optical fiber end and evaluated with respect to its intensity at the other optical fiber end. By displacing the component relative to the laser diode, the optimum coupling position is determined by evaluating the intensity. The adhesive is cured in this position (so-called "active adjustment"). However, with reference to the curing of the adhesive there is a need in this case to make use, in a fashion limiting the choice of material, of transparent materials for the holding region (holder) and/or to occupy the production equipment for a comparatively long time, at least until the adhesive has reached a basic strength which permits the semi-finished module to be removed. With regard to these problems, it is conceivable to make simultaneous use of a plurality of adhesives, a first, quickly curing adhesive ensuring prefixing. However, in this case additional production difficulties and partly contrary optimization goals arise. Thus, there would be a need for multiple application of adhesive. Furthermore, although highly filled adhesives have mechanically favorable properties, they can impair the curing of the quickly curing adhesive.

Summary of the Invention

It is accordingly an object of the invention to provide a method for producing an electrooptical module that overcomes the above-mentioned disadvantages of the prior art methods of this general type, which ensures that the component is connected in a way which is stable in the long term and permanent, in particular in the case of external mechanical and climatic conditions, and mechanically firm to the holding region in conjunction with extremely short machining periods, at least for the devices used for adjusting and precise positioning.

With the foregoing and other objects in view there is provided, in accordance with the invention, an improved method for producing an electrooptical module having a front side, a coupling socket for holding an optical fiber end disposed on the front side, a rear side with a holding region, and an electrooptical component disposed in the holding region, the improvement which includes: placing the electrooptical component into a position of maximum optical coupling with the optical fiber end held by the coupling socket; fixing the electrooptical component in the position of maximum optical coupling to the holding region with an adhesive, the adhesive including a material curable by light and by heat; prefixing via optical curing of the adhesive the electrooptical component in the position of maximum optical coupling; and curing thermally the adhesive in one of a temporally and spatially separate subsequent production step for permanently fixing the electrooptical component to the holding region.

The object is achieved according to the invention in the case of the method of the type mentioned at the beginning by virtue of the fact that a material that can be cured both by light and by heat is used as the adhesive. In that prefixing is done by optical curing of the adhesive in the position of maximum optical coupling, and in that in a temporally and/or spatially separate subsequent production step an entirely permanent connection is made by thermal curing.

A substantial advantage of the method according to the invention consists in that the adhesive can be cured very quickly by optical irradiation. For example by UV light and therefore achieves fixing and strength sufficient for the precise fixing of the electrooptical component on the device side to be replaced by its own prefixing. As a result, the electrooptical module preassembled so far can already be removed after a short machining period from the device serving the purpose of external fixing and, if appropriate, adjustment. The device can already subsequently be used, in a way advantageous in terms of production engineering to adjust and fix a further electrooptical module. The subsequent complete fixing of the component in the holding region by thermal curing, in particular of the regions inaccessible to the light, can advantageously be performed separately temporally or spatially. A further important advantage of the method according to the invention consists in that only a single application of adhesive is required.

The compositions disclosed in Published, Non-Prosecuted German Patent Application 195 45 552 A and in Published European Patent Application EP 0 504 569 A2 as well as the two-component adhesive marketed under the trade name of DELO-DUOKAT® VE 293 by DELO Industrieklebstoffe GmbH & Co. KG, Ohmstr. 3, 86899 Landsberg have proved to be particularly suitable for the method according to the invention.

A further simplification in terms of production engineering with regard to the application of adhesive follows according to an advantageous refinement of the method according to the invention by virtue of the fact that the joint gap between the holding region and the electrooptical component and/or a component carrier is constructed in a plane which is perpendicular to the longitudinal axis of the coupling socket.

A refinement of the invention preferred for this purpose provides that, at the joint gap, at least one adhesive gap aligned parallel to the longitudinal axis of the coupling socket is constructed between at least one tongue and at least one cutout of the holding region of the coupling socket and electrooptical component with a gap width which permits the electrooptical component to be aligned into a position of maximum optical coupling, and in that the adhesive is introduced into the adhesive gap.

A substantial advantage of the refinement consists in that the adhesive gap lends the module a particularly firm, and therefore reliable, connection between the electrooptical component and the holding region of the coupling socket, because the adhesive gap is provided in addition next to the joint gap.

In this case, the at least one tongue on the holding region of the coupling socket or on the electrooptical component, and the at least one cutout can correspondingly be provided on the electrooptical component or on the holding region. However, it is also possible to provide in each case more than one tongue and more than one cutout if this is permitted by the structural and optical requirements placed on the electrooptical module.

It is to be regarded as particularly advantageous when the holding region of the coupling socket is provided on its outer edge with a plurality of tongues in the form of pins, and the electrooptical component is provided on its outer edge with cutouts which are flush with the pins in the mounted state.

Specifically, in this configuration relatively large regions of the adhesive gaps can be subjected to the light, and this promotes the prefixing of the adhesive used by optical curing.

In order to permit the light multiple access points to the joint region in the first curing step, an advantageous embodiment of the invention provides that additional access points of light to the adhesive are created by geometrical shaping and/or optical properties of the electrooptical component and/or of a component carrier and/or of the holding region.

The geometrical shaping serving the purpose of optical access can contribute in an additional function to a substantial increase in the mechanical stability of the connection by virtue of the fact that the electrooptical component and/or the component carrier and/or the holding region are provided with openings which can be accessed by light from outside, lead to the joint gap, taper toward the joint gap and are introduced into the adhesive.

Other features which are considered as characteristic for the invention are set forth in the appended claims.

Although the invention is illustrated and described herein as embodied in a method for producing an electrooptical module, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic, semi-symmetrical, fragmentary, longitudinal sectional view of an electrooptical module according to the invention;

FIG. 2 is a flow chart showing essential method steps;

FIG. 3 is a top plan view of a further electrooptical module produced using the method according to the invention;

FIG. 4 is a sectional view of the further module taken along the line IV—IV shown in FIG. 3;

FIG. 5 is a side-elevational view of the further module according to FIG. 3;

DESCRIPTION OF THE PREFERRED EMBODIMENTS

Figure 7:
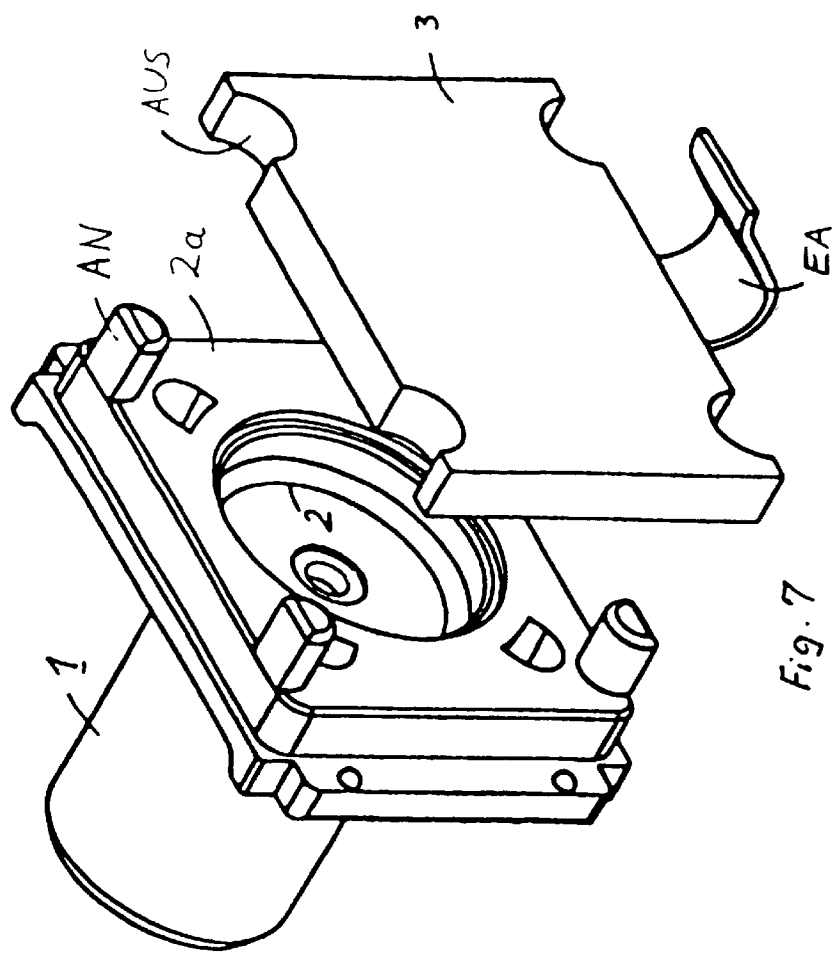
FIG. 7 is an exploded perspective view of the further module according to FIG. 6.

In all the figures of the drawing, sub-features and integral parts that correspond to one another bear the same reference symbol in each case. Referring now to the figures of the drawing in detail and first, particularly, to FIG. 1 thereof, there is shown an electrooptical module. The electrooptical module has a coupling socket 1, also denoted as a flange, for holding an optical fiber plug 40 in whose central bore, one end of an optical fiber 41 is disposed in the usual way. The coupling socket 1 is constructed in one piece with a rear having a holding region 2 that serves to hold an electrooptical component 3 and has a flange 2a extending radially outward. The electrooptical component 3 includes a housing 4 and, for example, an optical transmitter (laser diode) 5 which can be driven via electric connections 7, 8 entering the housing 4. When driven electrically, the laser diode 5 emits light signals which can be launched into an optical fiber end 42 via an optical window 9 and/or a lens and an optical channel 12 connecting the coupling socket 1 to the holding region 2.

In order to produce the electrooptical module (FIG. 2), the optical fiber plug 40 with the optical fiber end 42 is inserted into the coupling socket 1 up to a stop 13 (step 100), and at the other end of the optical fiber 41 light signals launched into the latter are evaluated with regard to their intensity. An adhesive ("Dual-Cure-Epoxy") which can be cured both by light and by heat is applied from the rear side onto a rear flange surface 16 of the flange 2a. Subsequently, the electrooptical component 3, which is surrounded by a component carrier in the form of mounting ring 18 and connected firmly to the latter, e.g. by prior welding in a weld region 20, is inserted centrally into the holding region 2 with the interposition of an adhesive 14 between the mounting ring 18 and the flange surface 16 (step 200). The result is a formation of a joint gap 26 between the flange surface 16 and a surface 24, facing it, of the mounting ring 18. The joint gap 26 which is filled with the adhesive 14 permits an adjusting movement of the component 3 in the plane X-Y perpendicular to a longitudinal axis Z of the module or the coupling socket 1 (step 300).

When actively adjusted, the electrooptical component 3 is positioned in the holding region 2 in the X-Y plane in such a way that a signal maximum, and thus the position of maximum optical coupling, is reached (step 400, FIG. 2). In this position, a region of the joint gap 26 experiences an illumination which is represented by arrows 30 and leads to immediate incipient curing of the adhesive 14 (step 500). In order to facilitate the access of light, passage openings 32, 34 which taper conically toward the joint gap 26 are provided both in the flange-like extension 2a of the holding region 2 and in the mounting ring 18. During the joining operation, a portion of the adhesive 14 enters the openings 32, 34, and after curing forms an additional self-closure between the joint partners 2a, 18. Subsequently, after an extremely short curing and machining period, the prefabricated module can already be removed from the production equipment and subsequently be subjected in a temporally and spatially separate fashion to a thermal curing process in which even the adhesive parts not accessible to the light are completely and permanently cured (step 600).

Owing to the vertical orientation of the joint gap 26 relative to the longitudinal axis Z, it is possible for the adhesive 14 to be applied, in a way which is advantageous in terms of production engineering, in a particularly simple fashion which, in accordance with the method according to the invention, need be done only once. The conical openings 32, 34 constructed perpendicular to the joint gap 26 advantageously permit additional optical irradiation of the joint region, and, furthermore, after curing of the adhesive 14 form a self-closure which increases the mechanical strength.

Figure 6:
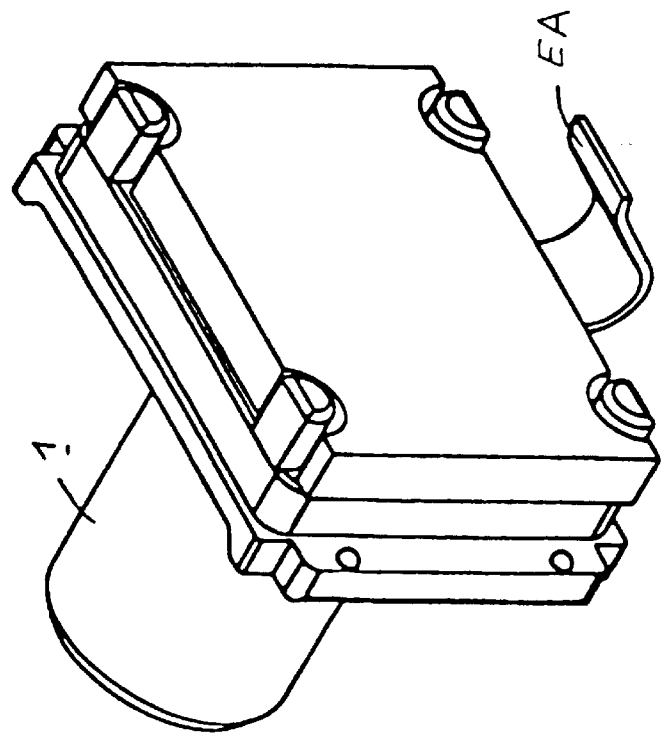
FIG. 6 is a perspective view of the assembled further electrooptical module.

As is shown by the further exemplary embodiment represented in FIGS. 3–5, the component 3 can be constructed in the shape of a plate and have the optical transmitter 5 which can be constructed as a laser diode. The optical transmitter 5 can be driven via electric connections EA (see FIGS. 6 and 7). The optical transmitter 5 emits light signals that can be launched via an opening containing a lens, if appropriate, into the end of the optical fiber 41.

As a supplement to the joint gap 26 previously described, there are provided on the edge of the flange 2a of the coupling socket 1 four pins AN (FIG. 3) which extend parallel to the longitudinal axis Z of the coupling socket 1. The pins AN engage in the mounted state, as is shown, in particular, by FIGS. 5 and 6, in cutouts AUS on the edge of the electrooptical component 3. In this configuration, the pins AN are dimensioned with regard to the openings AUS so as to produce in each case an adhesive gap KS the width of which is selected such that when the electrooptical module is mounted it permits alignment into a position of maximum optical coupling.

When the electrooptical module according to the invention is produced, it is not only the joint gap 26 which is provided with adhesive 14 which can be cured both by light and by heat, but also the respective adhesive gap KS. Because of the use of such an adhesive, it is possible to undertake prefixing by optical curing after alignment of the coupling socket 1 with reference to the electrooptical component 3 not only in the region of the joint gap 26, but also in the region of the adhesive gap KS, because light has good access to the adhesive gap KS. Subsequently, thermal curing is performed, so that the electrooptical module composed of the coupling socket 1 with the electrooptical module 3 is then joined together permanently and very firmly in mechanical terms.

We claim:

1. An improved method for producing an electrooptical module having a front side, a coupling socket for holding an optical fiber end disposed on the front side, a rear side with a holding region, and an electrooptical component disposed in the holding region, the improvement which comprises:

providing the holding region with passage openings to facilitate the access of light;

placing the electrooptical component into a position of maximum optical coupling with the optical fiber end held by the coupling socket;

fixing the electrooptical component in the position of maximum optical coupling to the holding region with an adhesive, the adhesive including a material curable by light and by heat;

prefixing via optical curing of the adhesive the electrooptical component in the position of maximum optical coupling; and curing thermally the adhesive in one of a temporally and spatially separate subsequent production step for permanently fixing the electrooptical component to the holding region.

2. The method according to claim 1, which comprises:

positioning the holding region in relationship to at least one of the electrooptical component and a component carrier mounting the electrooptical component for defining a joint gap therebetween, the joint gap being in a plane perpendicular to a longitudinal axis of the coupling socket; and introducing the adhesive into the joint gap.

3. The method according to claim 1, which comprises:

positioning the holding region in relationship to the electrooptical component for defining a joint gap therebetween, the joint gap being in a plane perpendicular to a longitudinal axis of the coupling socket; and introducing the adhesive into the joint gap.

4. The method according to claim 1, which comprises:

positioning the holding region in relationship to the electrooptical component and a component carrier mounting the electrooptical component for defining a joint gap therebetween, the joint gap being in a plane perpendicular to a longitudinal axis of the coupling socket; and introducing the adhesive into the joint gap.

5. The method according to claim 2, which comprises:

providing the holding region with at least one tongue;

forming the electrooptical component with at least one cutout formed therein such that the at least one tongue disposed in the at least one cutout define at least one adhesive gap between the at least one tongue and the at least one cutout, the at least one adhesive gap aligned parallel to the longitudinal axis of the coupling socket and having a gap width permitting the electrooptical component to be aligned into the position of maximum optical coupling; and introducing the adhesive into the at least one adhesive gap.

6. The method according to claim 5, which comprises:

forming a plurality of the at least one tongue as pins at an outer edge of the holding region of the coupling socket; and forming a plurality of the at least one cutout at an outer edge of the electrooptical component such that the pins are flush with the outer edge of the electrooptical component in a mounted state.

7. The method according to claim 2, which comprises creating an additional light access path to the adhesive by at least one of geometrical shaping and modifying optical properties of at least one of the electrooptical component and the holding region.

8. The method according to claim 7, which comprises forming openings in at least one of the electrooptical component and the holding region, where the openings are accessed by light from outside, lead to the joint gap, taper toward the joint gap and are introduced into the adhesive.

9. An improved method for producing an electrooptical module having a front side, a coupling socket for holding an optical fiber end disposed on the front side, a rear side with a holding region, and a component carrier disposed in the holding region, the improvement which comprises:

providing the holding region with passage openings to facilitate the access of light;

placing the component carrier into a position of maximum optical coupling with the optical fiber end held by the coupling socket;

fixing the component carrier in the position of maximum optical coupling to the holding region with an adhesive, the adhesive including a material curable by light and by heat;

prefixing via optical curing of the adhesive the component carrier in the position of maximum optical coupling; and curing thermally the adhesive in one of a temporally and spatially separate subsequent production step for permanently fixing the component carrier to the holding region.

10. The method according to claim 9, which comprises:

positioning the holding region in relationship to a component carrier mounting an electrooptical component for defining a joint gap therebetween, the joint gap being in a plane perpendicular to a longitudinal axis of the coupling socket; and introducing the adhesive into the joint gap.

11. The method according to claim 10, which comprises creating an additional light access path to the adhesive by at least one of geometrical shaping and modifying optical properties of at least one of the component carrier and the holding region.

12. The method according to claim 11, which comprises forming openings in at least one of the component carrier and the holding region, where the openings are accessed by light from outside, lead to the joint gap, taper toward the joint gap and are introduced into the adhesive.

* * * * *